United States Patent
Isaka

(10) Patent No.: US 11,230,144 B2
(45) Date of Patent: Jan. 25, 2022

(54) PNEUMATIC TIRE

(71) Applicant: Sumitomo Rubber Industries, Ltd., Kobe (JP)

(72) Inventor: Wataru Isaka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 428 days.

(21) Appl. No.: 16/104,409

(22) Filed: Aug. 17, 2018

(65) Prior Publication Data

US 2019/0077196 A1 Mar. 14, 2019

(30) Foreign Application Priority Data

Sep. 8, 2017 (JP) .............................. JP2017-173273

(51) Int. Cl.
*B60C 9/20* (2006.01)
*B60C 9/18* (2006.01)

(52) U.S. Cl.
CPC ............... *B60C 9/20* (2013.01); *B60C 9/18* (2013.01); *B60C 2009/2016* (2013.01); *B60C 2009/2019* (2013.01); *B60C 2009/2087* (2013.01); *B60C 2200/10* (2013.01)

(58) Field of Classification Search
CPC .............. B60C 9/20; B60C 2009/2022; B60C 2009/2016; B60C 2009/2087; B60C 2009/2025
USPC ........................................................ 152/535
See application file for complete search history.

(56) References Cited

U.S. PATENT DOCUMENTS

| 3,658,999 | A | * | 4/1972 | Tangorra et al. | ...... B29D 30/38 156/133 |
| 6,276,415 | B1 | * | 8/2001 | Nakamura | ................ B60C 9/22 152/209.11 |
| 2006/0130949 | A1 | * | 6/2006 | Nakamura | ............ B60C 19/001 152/209.11 |
| 2010/0089511 | A1 | | 4/2010 | Terada | |
| 2010/0206451 | A1 | | 8/2010 | Ishiyama | |
| 2014/0261951 | A1 | * | 9/2014 | Domingo | .................. B60C 1/00 152/527 |

(Continued)

FOREIGN PATENT DOCUMENTS

| JP | 63173703 | A | * | 7/1988 |
| JP | 2006199074 | A | * | 8/2006 |
| JP | 2008-149990 | A | | 7/2008 |

(Continued)

OTHER PUBLICATIONS

Extended European Search Report dated Jan. 29, 2019, for European Application No. 18187493.4.

*Primary Examiner* — Katelyn W Smith
*Assistant Examiner* — Farah Taufiq
(74) *Attorney, Agent, or Firm* — Birch, Stewart, Kolasch & Birch, LLP

(57) ABSTRACT

A pneumatic tire comprises a belt layer disposed in the tread portion. The average cord angle θn and average cord count Nn of the belt layer are constant or gradually increases or decreases from a center position to shoulder positions. The ratio θns/θnc of the average cord angle θns at the shoulder positions to the average cord angle θnc at the center position is 1.30 or less. The ratio Nns/Nnc of the average cord count Nns at the shoulder positions to the average cord count Nnc in the center position is 0.77 or more.

16 Claims, 7 Drawing Sheets

(56) References Cited

U.S. PATENT DOCUMENTS

2017/0197470 A1*  7/2017  Maruoka ............ B29D 30/0601
2017/0355230 A1*  12/2017  Suzuki ...................... B60C 9/30

FOREIGN PATENT DOCUMENTS

| JP | 2009-90833 A | 4/2009 |
| JP | 2013-141884 A | 7/2013 |

* cited by examiner

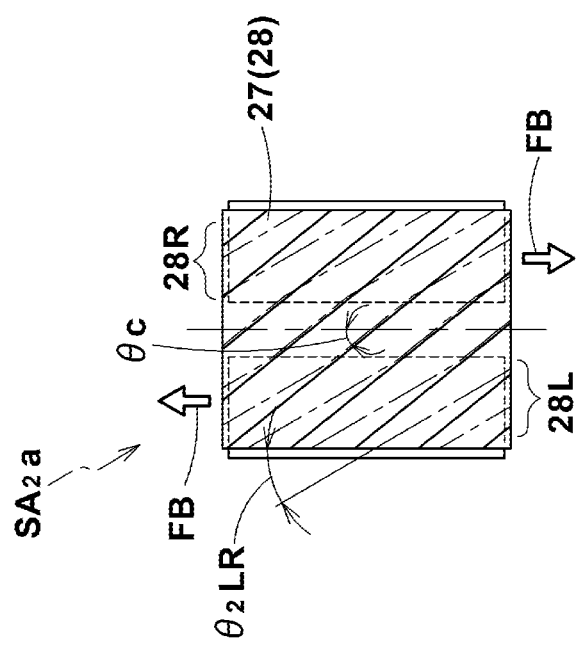
FIG.5(A)
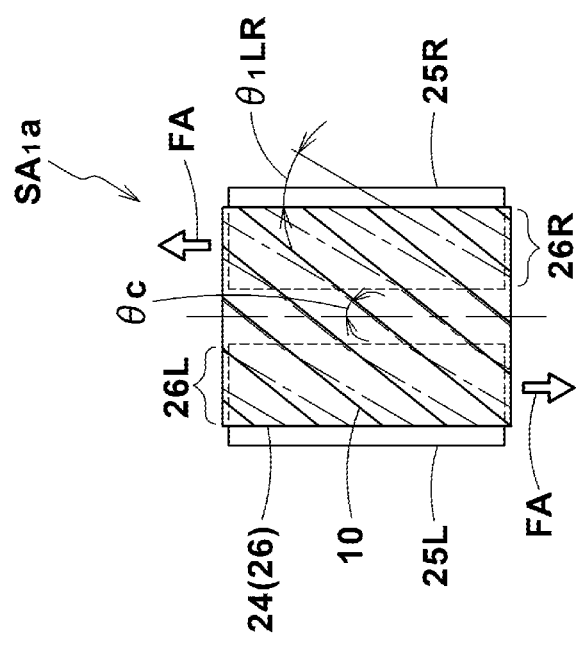
FIG.5(B)
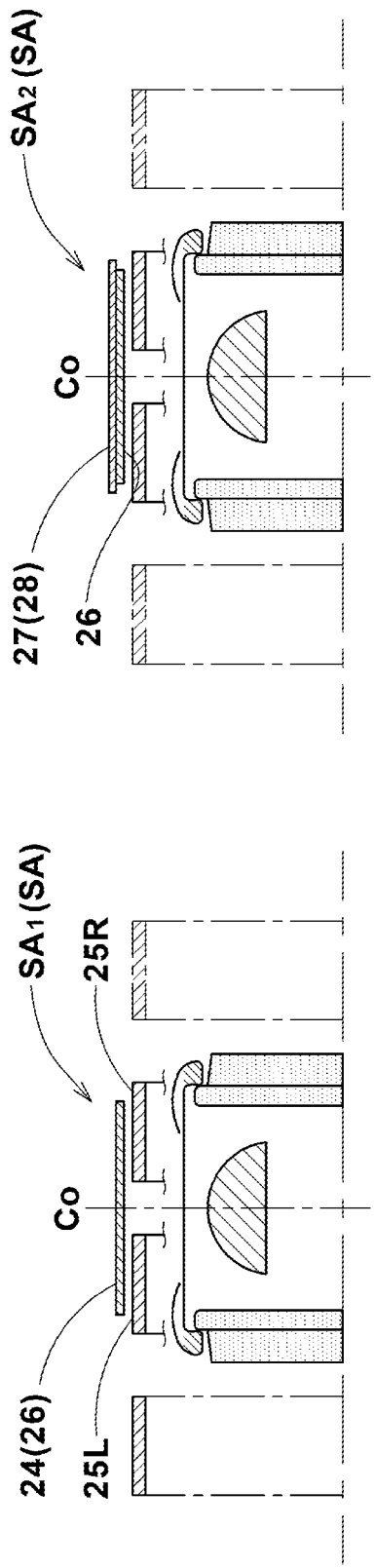

PNEUMATIC TIRE

TECHNICAL FIELD

The present invention relates to a pneumatic tire, more particularly to a structure of a tread reinforcing belt layer capable of improving handling stability of a motorcycle tire during turning.

BACKGROUND ART

In general, pneumatic tires are manufactured through a first forming process and a second forming process, and a vulcanizing process. In the first forming process, a primary tire casing comprising a carcass ply/plies is formed in a cylindrical shape. In the subsequent second forming process, the primary tire casing is swollen into a toroidal shape, and then on the bulged portion thereof, tread forming members including a tread reinforcing belt ply/plies are assembled to form a green tire.

In the second forming process, as schematically shown in FIG. 7(A), the assembly of the tread forming members (a) has a cylindrical shape at first as indicated by imaginary line, although the primary tire casing has the toroidal shape. Therefore, in order to fit the cylindrical assembly to the curved outer surface of the toroidal primary tire casing (c), the so-called turn-down operation has to be made.

In the turn-down operation, the assembly of the tread forming members is pressed onto the primary tire casing (c) by pressure rollers (d) moving from the inside to the outside in the tire axial direction. As a result, as shown in FIG. 7(B) exaggeratingly, the angles of belt cords of the belt ply a1 with respect to the tire circumferential direction are varied, and the angle αs in the lateral portions of the belt ply a1 becomes larger than the angle αc in the central portion of the belt ply a1. In addition, the belt cords in the belt ply a1 are also varied in the cord count (the number of the belt cords per a unit width counted in a direction perpendicular to the belt cords), and the cord count in the lateral portions becomes smaller than the cord count in the central portion.

The increase in the angle and the decrease in the cord count which occur in the turned-down lateral portions are more remarkable in a motorcycle tire as the radius of curvature of the tread is small as compared with those of tires in other category such as passenger car tires and heavy duty tires.

Due to this, the motorcycle tire may have a problem such that tread edge portions of the tire can not be sufficiently restrained and reinforced by the lateral portions of the belt ply, and the handling stability (cornering stability) during turning made by leaning the motorcycle is deteriorated.

Japanese Patent Application Publication No. 2008-149990 discloses a motorcycle tire provided with a belt ply, wherein the belt ply is divided into three parts in the tire axial direction, in other words, the belt ply is made up of three separated narrow ply pieces: one central piece and two lateral pieces, and the cord angle in the lateral pieces is changed in advance from that in the central piece.
In this case, however, there may be a problem with the transient performance when initiating a turn by leaning the motorcycle such that unstable behavior occurs due to the discontinuity of the belt ply between the central piece and lateral pieces which may cause an abrupt characteristic change on the belt ply.

SUMMARY OF THE INVENTION

It is therefore, an object of the present invention to provide a motorcycle tire, in which the handling stability during turning is improved, while ensuring excellent transient performance.

According to the present invention, a pneumatic tire comprises:

a belt layer disposed in a tread portion and radially outside a carcass and composed of two or more belt plies including the narrowest belt ply, each of the belt plies composed of belt cords inclined with respect to the tire circumferential direction and extending continuously from one axial edge to the other axial edge of the belt ply, wherein, given that:
(1) a center position is an axial position on the tire equator;
(2) a shoulder position is an axial position on each side of the tire equator at a distance of 15 mm inward in the axial direction from the axially outer end of the narrowest belt ply along the outer surface of the belt layer;
(3) an average cord angle θn is the average of the cord angles with respect to the tire circumferential direction, of the belt cords of all the belt plies obtained at any axial position between the center position and the shoulder position, and
(4) an average cord count Nn is the average of the cord count per 25 mm width perpendicularly to the belt cords, of the belt cords of all the belt plies obtained at any axial position between the center position and the shoulder position, the average cord angle θn is constant or gradually increases or decreases from the center position to the shoulder positions, the average cord count Nn is constant or gradually increases or decreases from the center position to the shoulder positions, the ratio θns/θnc of the average cord angle θns at the shoulder positions to the average cord angle θnc at the center position is 1.30 or less, and the ratio Nns/Nnc of the average cord count Nns at the shoulder positions to the average cord count Nnc in the center position is 0.77 or more.

The ratio Nns/Nnc is preferably 0.80 or more.
The ratio θns/θnc is preferably 1.20 or less.
The average cord count Nn is preferably gradually increased from the center position to the shoulder positions.
The average cord angle θn is preferably gradually decreased from the center position to the shoulder positions.
Preferably, the ratio θns/θnc is 1.00 or less, and the ratio Nns/Nnc is 1.20 or more.
The average cord angle θn is preferably in a range from 10 to 40 degrees.

BRIEF DESCRIPTION OF THE DRAWINGS

FIGS. 5(A) and 5(B) are diagrams illustrating a process of forming a unvulcanized belt layer.

DESCRIPTION OF THE PREFERRED EMBODIMENTS

Embodiments of the present invention will now be described in detail in conjunction with accompanying drawings.

Figure 1:
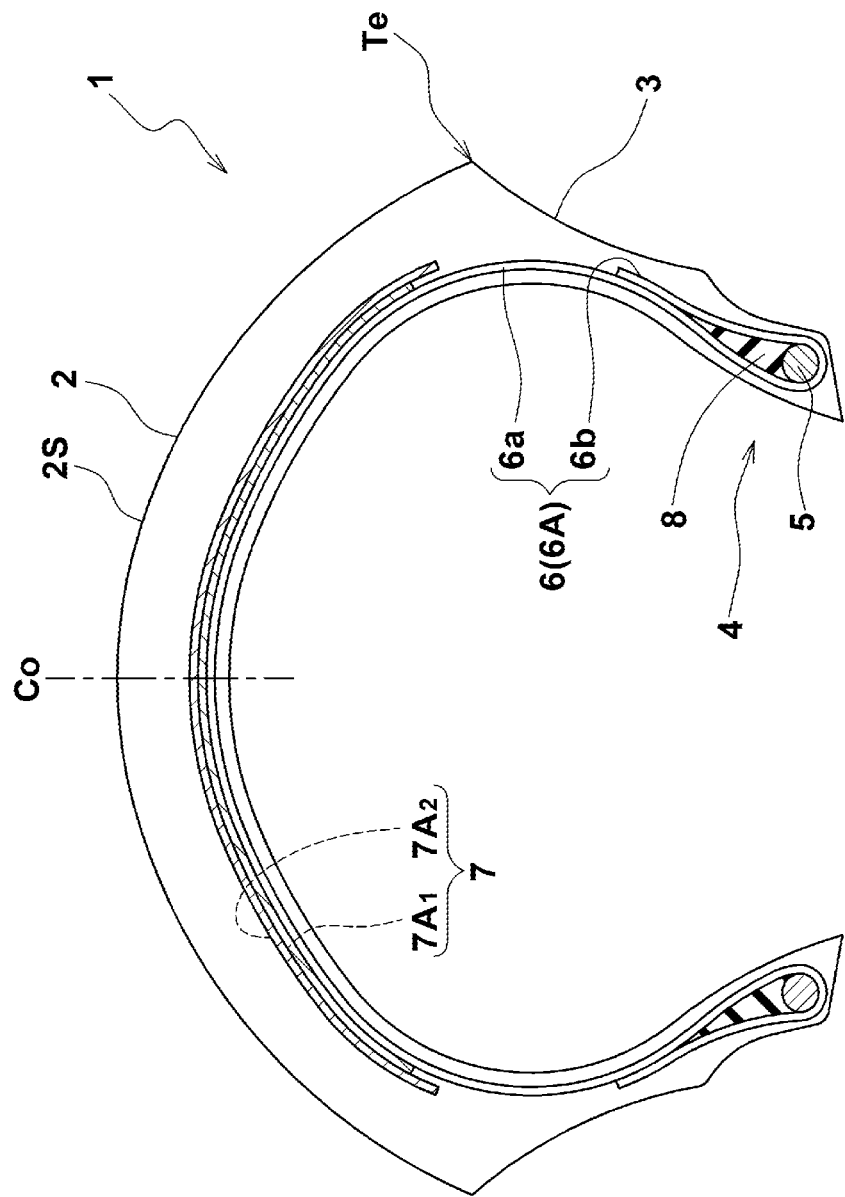
FIG. 1 is a cross-sectional view of a pneumatic tire as an embodiment of the present invention.

As shown in FIG. 1, a pneumatic tire 1 as an embodiment of the present invention comprises: a tread portion 2, a pair of sidewall portions 3, a pair of bead portions 4 each with a bead cores 5 therein, a carcass 6 extending between the bead portions 4 through the tread portion 2 and the sidewall portions 3, and a belt layer 7 disposed radially outside the carcass 6 in the tread portion 2.

In the present embodiment, the pneumatic tire 1 is a motorcycle tire, in which the tread surface 2s or the outer surface of the tread portion 2 is curved convexly in an arcuate shape in the cross sectional view from the tire equator co to both tread edges Te. And as a characteristic of a motorcycle tire, the maximum tire section width occurs between the tread edges Te, thus, which is the same as the tread width measured in the tire axial direction.

The carcass 6 is compose of one or more plies of carcass cords arranged at an angle of from 75 to 90 degrees with respect to the tire circumferential direction, for example. In this example, the carcass 6 is made up of a single carcass ply 6A. Fro the carcass cords, organic fiber cords such as nylon, polyester, and rayon are preferably employed.
The or each carcass ply 6A extends between the bead portions 4 through the tread portion 2 and the sidewall portions 3, and is turned up around the bead core 5 in each bead portion from the axially inside to the outside of the tire so as to form a pair of turnup portions 6b and a main portion 6a therebetween.

Between the main body portion 6a and the turnup portion 6b in each bead portion, a bead apex rubber 8 extending radially outwardly from the bead core 5 in a tapered manner is disposed in order to reinforce the bead portion.

The belt layer 7 is composed of two of more belt plies 7A of belt cords arranged to incline with respect to the tire circumferential direction. The belt layer 7 in this example is composed of two belt plies 7A1 and 7A2 which are generically referred to as the "belt ply 7A".
For the belt cords, organic fiber cords such as aramid, nylon and rayon, in particular, aramid fiber cords are preferably employed. Further, steel cords can be employed as well.

Figure 2A:
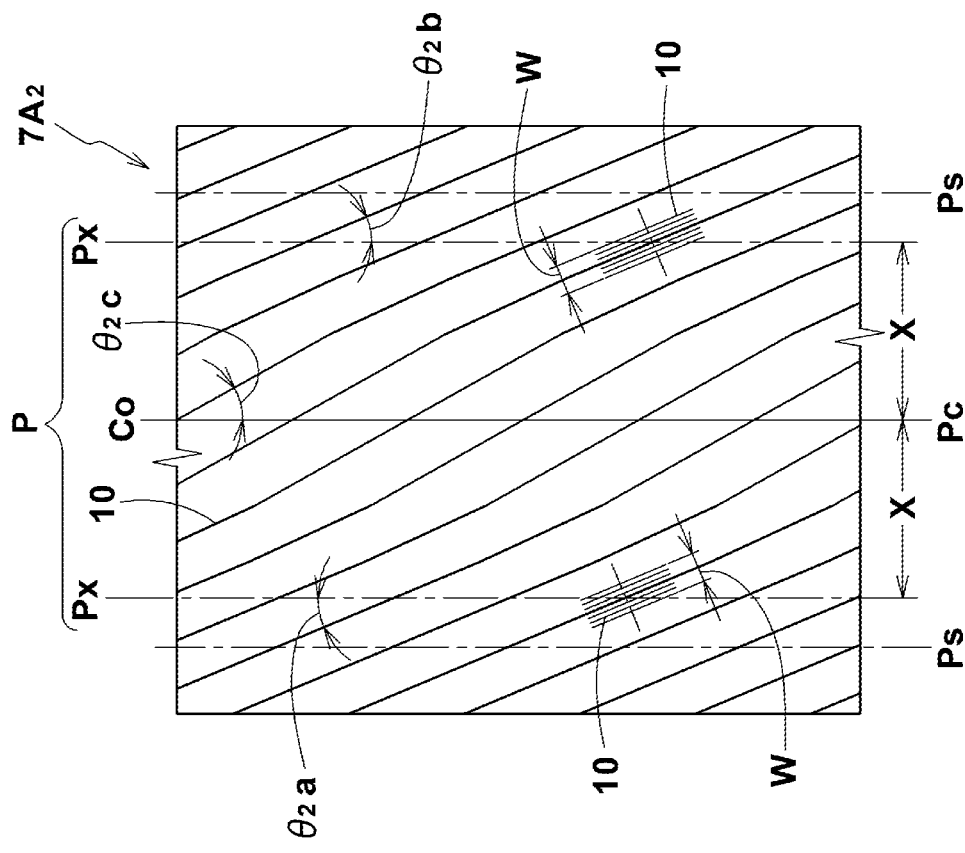
FIG. 2(A) is a schematic developed view of a radially inner belt ply of the belt layer thereof showing an arrangement of the belt cords therein.
Figure 2B:
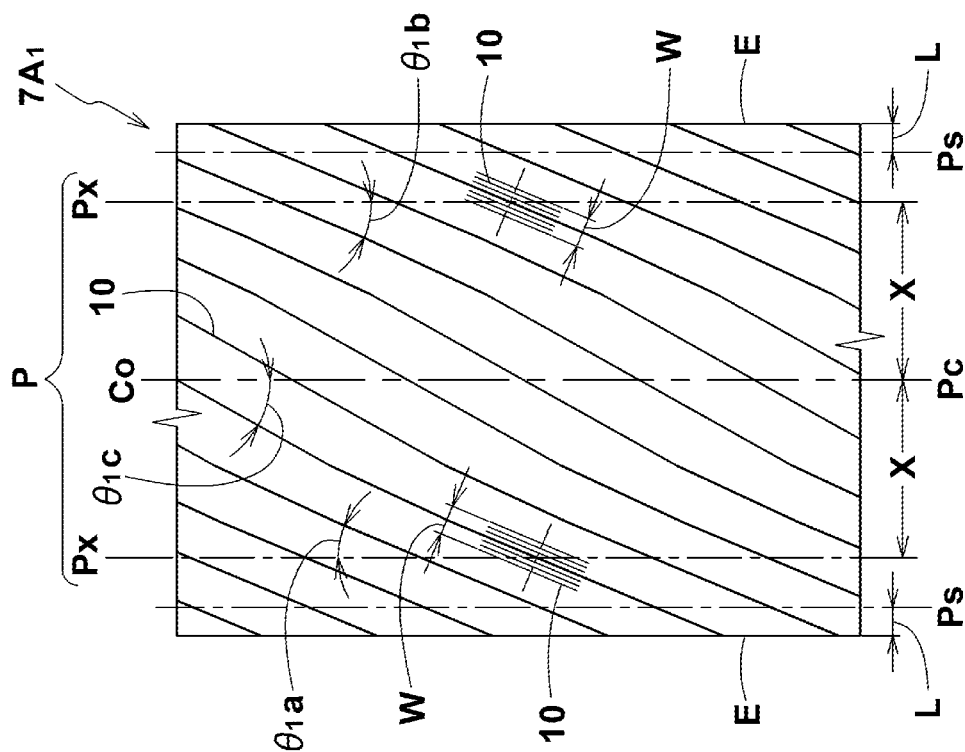
FIG. 2(B) is a schematic developed view of a radially outer belt ply of the belt layer showing an arrangement of the belt cords therein.

FIGS. 2(A) and 2(B) are schematic developed views of the belt plies 7A1 and 7A2 showing their belt cord arrangements. Incidentally, in these developed views, a circumferential length at an axially outer position is elongated relatively to that at an axially inner position.

In each belt ply 7A, the belt cords 10 therein extend continuously from one axially edge to the other axially edge of the belt ply 7A, and are arranged almost parallel with each other.

The belt ply 7A2 is lapped over the belt ply 7A1 so that the belt cords 10 of the belt ply 7A1 cross the belt cords 10 of the belt ply 7A2.

In the belt layer 7, the average cord angle $\theta n$ obtained at any axial position P between the center position Pc and the shoulder positions Ps is constant or gradually increased or decreased from the center position Pc to the shoulder positions Ps. That is, the average cord angle $\theta n$ is not changed from an increase to a decrease, or from a decrease to an increase.

Further, in the belt layer 7, the average cord count Nn obtained at any axial position P between the center position Pc and the shoulder positions Ps is constant or gradually increased or decreased from the center position Pc to the shoulder positions Ps. That is, the average cord count Nn is not changed from an increase to a decrease, or from a decrease to an increase.

Here, the expressions "gradually increase" and "gradually decrease" include such a condition that a part in which the parameter $\theta n$, Nn is constant, may exist between the center position Pc and the shoulder positions Ps.

The "center position Pc" means an axial position on the tire equator co.
The "shoulder position Ps" means an axial position on each side of the tire equator co at a distance L of 15 mm inward from the axially outer edge E of the narrowest belt ply (in this example, the belt ply 7A1) along the outer surface of the belt layer 7.

The "average cord angle $\theta n$" is a value obtained, at any axial position P described above, by averaging the angles $\theta$ with respect to the tire circumferential direction, of the belt cords 10 of the respective belt plies 7A (7A1 and 7A2).

The "average cord count Nn" is a value obtained, at any axial position P described above, by averaging the respective cord counts N of the belt cords 10 per 25 mm width w perpendicularly to the belt cords 10 of the respective belt plies 7A (7A1 and 7A2).

When the axial position P at a distance x (x> or =0) axially outward from the tire equator co along the outer surface of the belt layer 7 is expressed as "position Px",
if x>0, the position Px exist on both sides of the tire equator co as shown in FIGS. 2(A) and 2(B).

For example, if the belt layer is made up of the belt plies 7A1 and 7A2, the average cord angle $\theta n$ at the axial positions Px is the average value of the angles $\theta 1a$, $\theta 1b$, $\theta 2a$, and $\theta 2b$, wherein
$\theta 1a$ is the angle of the belt cords 10 of the belt ply 7A1 and $\theta 2a$ is the angle of the belt cords 10 of the belt ply 7A2 both measured at the position Px on one side of the tire equator co, and
$\theta 1b$ is the angle of the belt cords 10 of the belt ply 7A1 and $\theta 2b$ is the angle of the belt cords 10 of the belt ply 7A2 both measured at the position Px on the other side of the tire equator co.

If x=0, the average cord angle $\theta n$ is the average value of the angle $\theta 1c$ of the belt cord 10 of the belt ply 7A1 and the angle $\theta 2c$ of the belt cord 10 of the belt ply 7A2 both measured at the tire equator Co.

If x>0, the average cord end count Nn at the axial positions Px is the average value of the cord end counts N1a, N2a, N1b, and N2b, wherein
N1a is the belt cord count of the belt ply 7A1 and N2a is the belt cord count of the belt ply 7A2 both measured at the position Px on one side of the tire equator Co, and
N1b is the belt cord count of the belt ply 7A1 and
N2b is the belt cord count of the belt ply 7A2 both measured at the position Px on the other side of the tire equator co.

If x=0, the average cord end count Nn is the average value of N1c is the belt cord count of the belt ply 7A1 and N2c is the belt cord count of the belt ply 7A2 both measured at the tire equator Co.

In the present invention, the ratio θns/θnc of the average cord angle θns at the shoulder positions Ps to the average cord angle θnc at the center position Pc is set to 1.30 or less, namely, the value of the ratio is lower than the conventional values.

Further, the ratio Nns/Nnc of the average cord count Nns at the shoulder positions Ps to the average cord count Nnc at the center position Pc is set to 0.77 or higher, namely, the value of the ratio is higher than the conventional values.

In the present invention, as described above, the ratio θns/θnc of the average cord angles is low, and the ratio Nns/Nnc of the average cord counts is high, therefore, the restraining force in the tire circumferential direction by the belt layer and the stiffness of the tread portion are relatively increased in the tread shoulder regions. Thus, it is possible to improve the handling stability during cornering.

For that purpose, the ratio θns/θnc is preferably 1.20 or less, more preferably 1.00 or less.
The ratio Nns/Nnc is preferably 0.8 or more, more preferably 1.20 or more.
Further, the average cord angle θn is preferably in a range from 10 to 40 degrees in order to ensure the required restraining force.

It is possible to prevent an abrupt characteristic change of the belt layer 7 by satisfying:
(A) in each belt ply 7A, the belt cords 10 are continuous from one axially edge to the other axially edge of the belt ply 7A;
(B) the average cord angle θn is not changed from an increase to a decrease, or from a decrease to an increase; and
(C) an average cord count Nn is not changed from an increase to a decrease, or from a decrease to an increase.
By preventing such abrupt characteristic change, it is possible to stabilize the tire when leaning the motorcycle to make a turn, and excellent transient performance can be exhibited.

Figure 3:
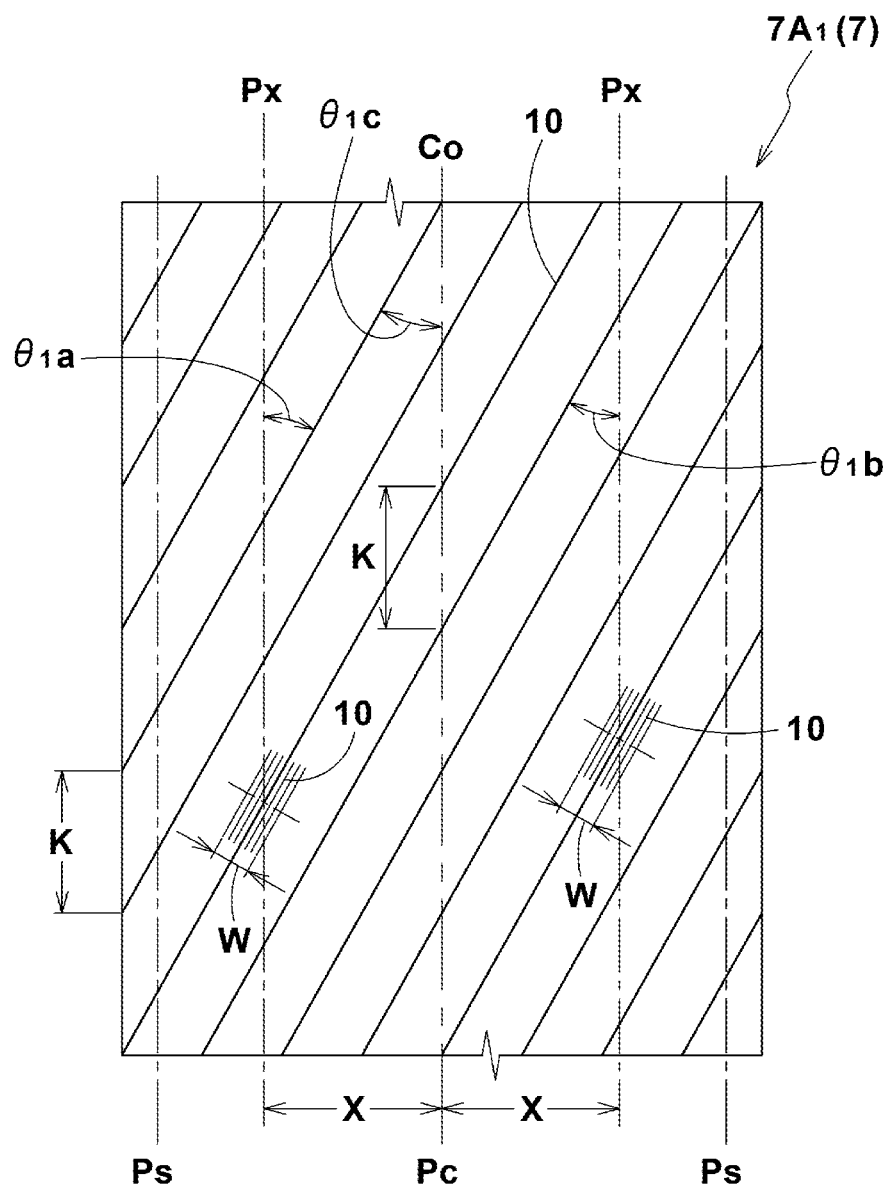
FIG. 3 is a schematic developed view of a belt ply showing another example of the arrangement of the belt cords therein.

But, it is most preferable for the belt layer 7 that the average cord angle θn is gradually decreased from the center position Pc to the shoulder positions Ps (ratio θns/θnc<1.00) as shown in FIGS. 2(A) and 2(B).
In this case, the average cord count Nn may be gradually increased from the center position Pc to the shoulder positions Ps (ratio Nns/Nnc>1.00). —First embodiment It is also preferable for the belt layer 7 that the average cord angle θn is constant from the center position Pc to the shoulder positions Ps (ratio θns/θnc=1.00) as shown in FIG. 3 by taking the belt ply 7A1 for instance.
In this case, the average cord count Nn may be gradually increased from the center position Pc to the shoulder positions Ps (ratio Nns/Nnc>1.00). —Second embodiment Incidentally, in the developed views shown in FIGS. 2-4, a length in the tire circumferential direction at an axially outer position is elongated relatively to that at an axially inner position. Accordingly, the belt cord spacings K in the tire circumferential direction are depicted as being constant in the tire axial direction. In reality, however, the belt cord spacings K become gradually decreased toward both axial edges of the belt ply from the axial center.

Thus, in the second embodiment, the ratio Nns/Nnc>1.00.

Figure 4:
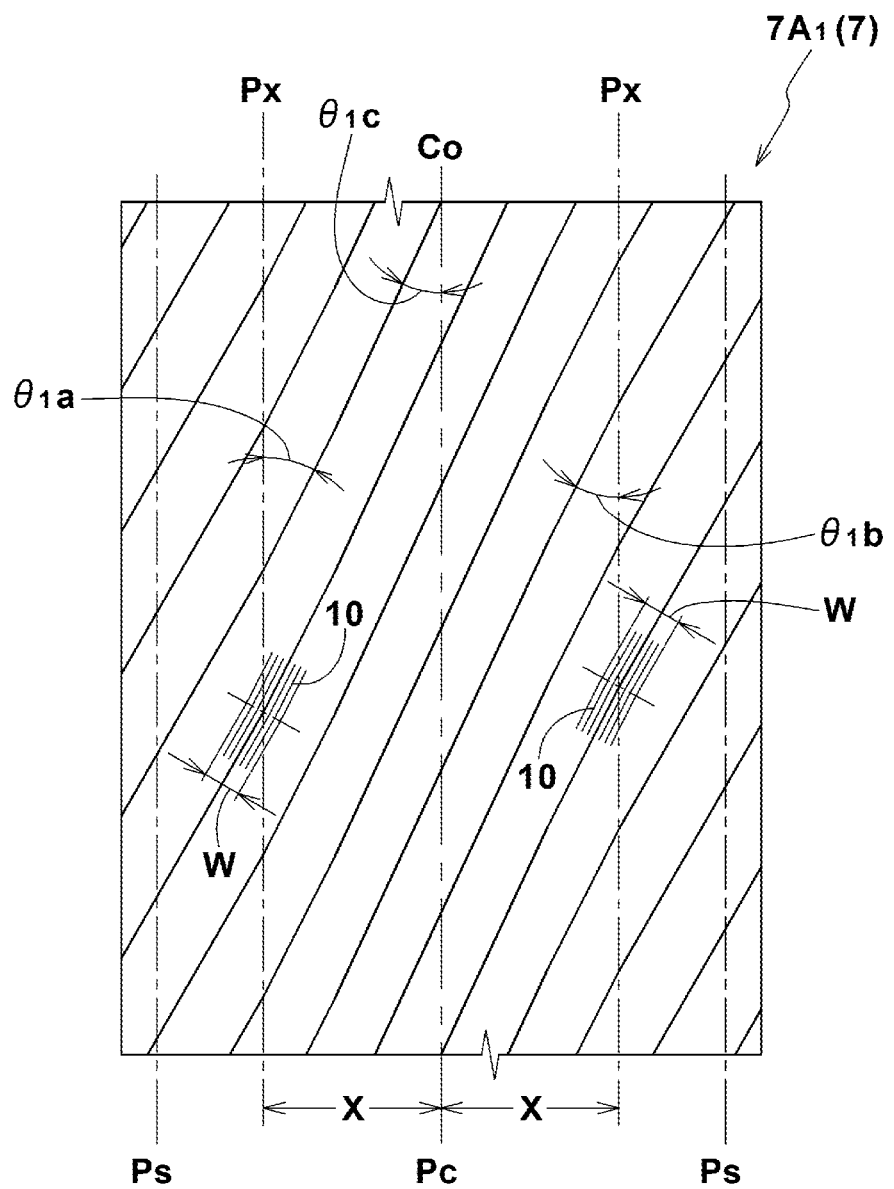
FIG. 4 is a schematic developed view of a belt ply showing still another example of the arrangement of the belt cords therein.

Also, it is preferable for the belt layer 7 that the average cord angle θn is increased from the center position Pc to the shoulder positions Ps (ratio θns/θnc>1.00) as shown in FIG. 4 by taking the belt ply 7A1 for instance.

In this case, the following are possible combinations with the above arrangement:
(1) the average cord count Nn may be gradually increased from the center position Pc to the shoulder positions Ps (ratio Nns/Nnc>1.00), —Third embodiment
(2) the average cord count Nn may be constant from the center position Pc to the shoulder positions Ps (ratio Nns/Nnc=1.00), —Fourth Embodiment
(3) the average cord count Nn may be gradually decreased from the center position Pc to the shoulder positions Ps (ratio Nns/Nnc<1.00)—Fifth embodiment.

In the third embodiment and the fourth embodiment, the ratio θns/θnc can occur in a range close to 1.00.

Although the fifth embodiment is close to a conventional design, it is possible to obtain the effect of improving the handling stability during turning when the ratio θns/θnc is 1.00 to 1.30 and the ratio Nns/Nnc is 0.77 to 1.00.

Next, a method of manufacturing the pneumatic tire will be described.

The pneumatic tire of the first embodiment can be formed by using a green tire manufactured as shown in FIGS. 5 and 6. The method of manufacturing a green tire 23 comprises: a process SA of making an unvulcanized belt layer 20; and a process SB of making the green tire 23 by affixing the unvulcanized belt layer 20 to to a primary tire casing 21 which is swollen into a toroidal shape from a cylindrical shape.

The process SA comprises a first step SA1 and a second step SA2.

In the first step SA1, a cylindrical belt ply 26 is formed by winding a strip of belt ply material 24 around two support rings 25R and 25L so as to extend therebetween as shown in FIG. 5(A).

In the second step SA2, a cylindrical belt ply 28 is formed by winding a strip of belt ply material 27 on the belt ply 26 as shown in FIG. 5(B).

The support rings 25L and 25R each have a cylindrical outer surface on which the belt ply material 24 is wound, and are movable in the tire axial direction toward both sides of the tire equator co as their axial center as to approach each other and get away from each other.

Each of the belt ply materials 24 and 27 is a strip of the rubberized parallel belt cords 10 inclined at a cord angle θc with respect to the tire circumferential direction.

The inclining direction of the belt cords 10 of the belt ply material 24 (for example right-side up inclination) is opposite to the inclining direction of the belt cords 10 of the belt ply material 27 (for example left-side up inclination).

The first step SA1 includes a step SA1a carrying out after forming the cylindrical belt ply 26. In the step SA1a,
a portion 26L of the belt ply 26 disposed on one support ring 25L (e.g. on the left side), and
a portion 26R of the belt ply 26 disposed on the other support ring 25R (e.g. on the right side)
are each applied by a twist FA in order to set the cord angles θc(θ1LR) in the respective portions 26L and 26R to be smaller than the cord angle θc in the central portion between the left and right portions 26L and 26R.
The direction of the twist FA is such that the cord angle θc in the lateral portion (26L, 26R) becomes smaller than the cord angle θc in the central portion. And the direction of the twist FA applied to the portion 26L is opposite to the direction of the twist FA applied to the portion 26R.

Such twist FA can be applied by pressing the belt ply 26 to the respective support rings 25L and 25R while applying equal and opposite torques to the support rings 25L and 25R.

The second step SA2 includes a step SA2a carrying out on the belt ply 28 formed on the belt ply 26. In the step SA2a, a portion 28L of the belt ply 28 disposed on the support ring 25L (e.g. on the left side), and a portion 28R of the belt ply 28 disposed on the support ring 25R (e.g., on the right side)

are each applied by a twist FB in order to set the cord angles $\theta c(\theta 2LR)$ of the respective portions 28L and 28R to be smaller than the cord angle $\theta c$ in the central portion between the left and right portions 28L and 28R.

The direction of the twist FB is such that the cord angle $\theta c$ in the lateral portion (28L, 28R) becomes smaller than the cord angle $\theta c$ in the central portion. And the direction of the twist FB applied to the portion 28L is opposite to the direction of the twist FB applied to the portion 28R.

Such twist FB can be applied by pressing the belt ply 28 to the respective support rings 25L and 25R through the belt ply 26 while applying equal and opposite torques to the support rings 25L and 25R.

Incidentally, by applying the twist FB, the previously set cord angles of the belt ply 26 may be affected. In this case, it is preferred to adjust the twists FA and FB so that the cord angles $\theta 1LR$ become equal to the cord angles $\theta 2LR$.

Figure 6B:
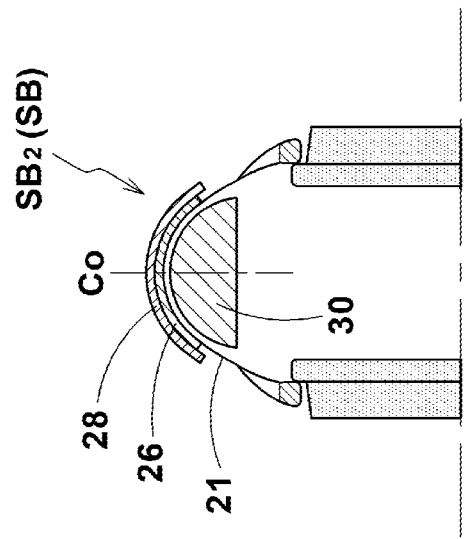
FIGS. 6(A) and 6(B) are diagrams illustrating a process of building a green tire by applying the unvulcanized belt layer to a primary tire casing.
Figure 6A:
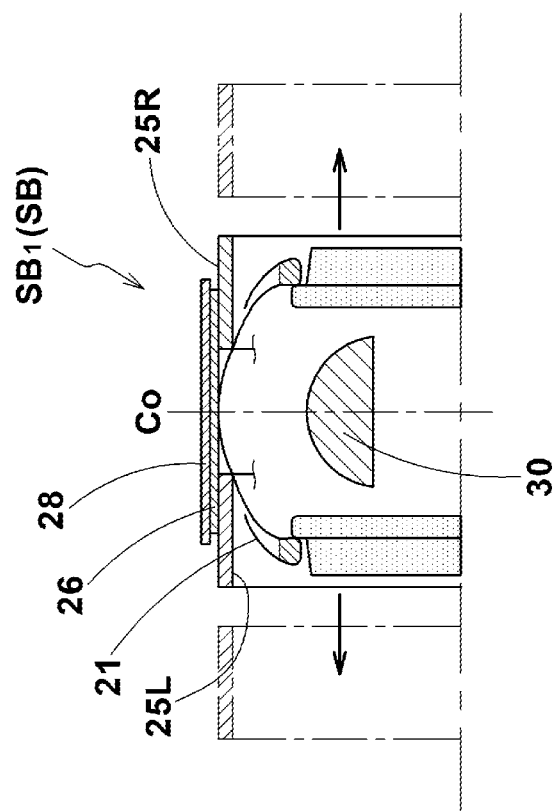
Figure 7B:
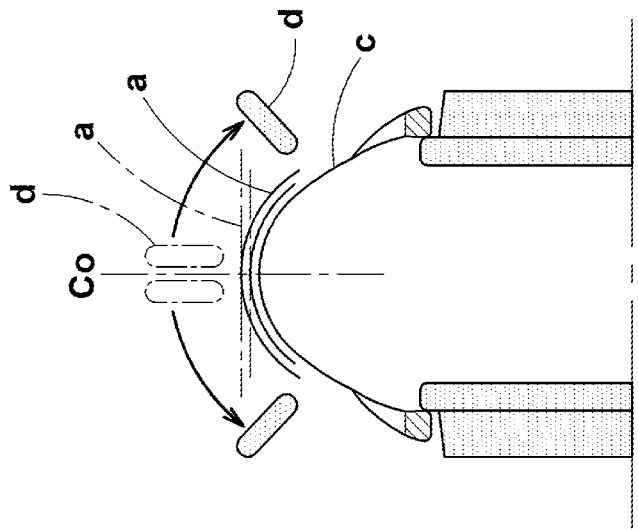
FIG. 7(B) is a schematic developed view of a conventional belt ply showing the arrangement of the belt cords therein.
Figure 7A:
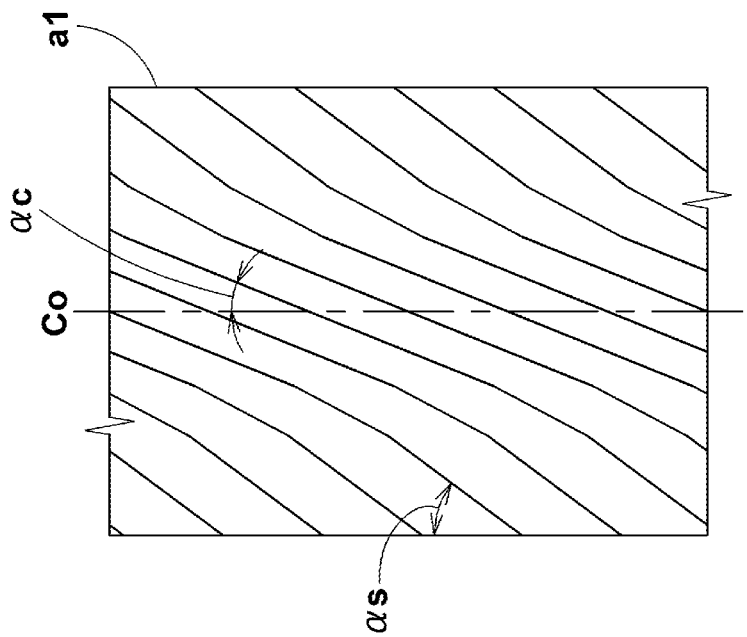
FIG. 7(A) is a diagram illustrating the conventional turn-down operation.

The process SB of making the green tire 23 comprises a first expansion step SB1 and a second expansion step SB2 as shown in FIGS. 6(A) and 6(B).

In the first expansion step SB1, the primary tire casing 21 is swelled by pressurizing the inside thereof by applying an initial inflation pressure, so that a bulged axial central portion of the primary tire casing 21 contacts with a portion of the inner surface of the cylindrical assembly of the belt plies 26 and 28 which portion is exposed from a gap between the support rings 25L and 25R and thereby the contacted portions are adhered to each other.

In the second expansion step SB2, the primary tire casing 21 is further swelled by using an expandable and contractible profile deck 30. The profile deck 30 has a profiled outer surface close to the profile of the inner surface of the tire 1. By expanding the profile deck 30 so that the profiled outer surface is moved radially outward beyond the support rings 25L and 25R, the primary tire casing 21 is further swelled into a toroidal shape together with the belt plies 26 and 28, thereby the primary tire casing 21 is pressed onto the radially inner surface of the assembly of the belt plies 26 and 28.

Thus, without performing the conventional turn-down operation, the belt plies 26 and 28 can be united with the primary tire casing 21.

It is also possible to manufacture the tires of the second-fifth embodiments by adjusting the twists FA and FB in the process SA of making the unvulcanized belt layer 20.

While detailed description has been made of preferable embodiments of the present invention, the present invention can be embodied in various forms without being limited to the illustrated embodiments.

Comparison Tests

Motorcycle tires of size 120/70ZR17 having the internal structure shown in FIG. 1 were experimentally manufactured and tested for the handling stability and transient performance. The specifications of the test tires are shown in Table 1. Common specifications are as follows.

Carcass: a single ply of nylon cords (1400 dtex/2) arranged radially at 90 degrees with respect to the tire equator.

Belt layer: two cross plies of aramid cords (1670 dtex/2) cord angles are shown in Table 1

The average cord angle $\theta n$ and the average cord count Nn were measured by disassembling the vulcanized tire.

The average cord angle $\theta nc$ is the average cord angle of the two belt plies measured at the center position Pc.

The average cord angle $\theta ns$ is the average cord angle of the two belt plies measured at the left and right shoulder positions Ps.

The average cord angle $\theta nm$ is the average cord angle the two belt plies measured at middle positions Pm on the outer surface of the belt layer between the center position Pc and the left and right shoulder positions Ps.

The average cord count Nnc is the average cord count of the two belt plies at the center position PC.

The average cord count Nns is the average cord count of the two belt plies at the left and right shoulder positions Ps.

The average cord count Nnm is the average cord count of the two belt plies at the above-mentioned left and right middle positions Pm.

As to the average cord angle, shown in Table 1 are the measured values of the average cord angles $\theta nc$, $\theta nm$, and $\theta ns$, together with their relative values based on the average cord angle $\theta nc$ being 100. The relative values are described in parentheses.

As to the average cord count, shown in Table 1 are the measured values of the average cord counts Nnc, Nnm, and Nns, together with their relative values based on the average cord count Nnc being 100. The relative values are described in parentheses.

(1) Easiness Test:

Each test tire was mounted on a front wheel (rim size MT5.50, tire pressure 200 kPa) of a 600 cc motorcycle, on the rear wheel of which a commercially available tire was mounted (tire size 180/55R17, rim size MT3.50, tire pressure 200 kPa).

The test rider evaluated into ten ranks the handle response and reaction (heaviness) which the rider's hands received when the motorcycle was leant to initiate a turn from the state of running straight at a speed of 80 km/h on a dry asphalt road surface of a tire test course. The results are shown in Table 1, wherein the higher rank number is better. Incidentally, the easiness requires a moderate cornering power.

If the cornering power is too high or too low, it is disadvantageous for the easiness.

(2) Cornering Stability Test:

During the above-described motorcycle was running in a corner of 50 meter radius at a speed of 70 km/h, disturbance was applied to the handle, and difficulty of applying the disturbance and convergence of the disturbance were evaluated by the test rider into ten ranks. The results are shown in Table 1, wherein the higher rank number is better.

The higher the difficulty and the earlier the convergence, the better the cornering stability.

(3) Transient Performance Test:

The above-described motorcycle running straight at a speed of 80 km/h was gradually leant to its fully leant state, and the change in the reaction was evaluated by the test rider into ten ranks. The results are shown in Table 1, wherein the higher rank number is better.

The transient performance is considered as being better when the reaction becomes gradually heavier as the leaning is increased.

As shown in Table 1, it was confirmed through the comparison tests that the tires Ex. 1-Ex. 7 according to the present invention were improved in the handling stability (or cornering stability) while securing excellent transient performance.

TABLE 1

| Tire | Ex. 1 | Ex. 2 | Ex. 3 | Ex. 4 | Ex. 5 | Ex. 6 | Ex. 7 | Ref. 1 |
|---|---|---|---|---|---|---|---|---|
| average cord angle | | | | | | | | |
| θnc (deg.) | 25 (100) | 22 (100) | 22 (100) | 25 (100) | 22 (100) | 25 (100) | 22 (100) | 22 (100) |
| θnm (deg.) | 23 (92) | 26 (118) | 24 (109) | 27 (108) | 22 (100) | 21 (84) | 24 (109) | 28 (127) |
| θns (deg.) | 20 (80) | 28 (127) | 26 (118) | 30 (120) | 22 (100) | 19 (76) | 26 (118) | 36 (164) |
| average cord end count | | | | | | | | |
| Nnc (/25 mm) | 17 (100) | 19 (100) | 19 (100) | 18 (100) | 20 (100) | 16 (100) | 17 (100) | 20 (100) |
| Nnm (/25 mm) | 19 (112) | 17 (89) | 17 (89) | 16 (89) | 22 (110) | 19 (119) | 18 (106) | 20 (100) |
| Nns (/25 mm) | 21 (124) | 15 (79) | 15 (79) | 14 (77) | 24 (120) | 22 (138) | 19 (112) | 15 (75) |
| easiness | 8 | 6 | 6 | 7 | 5 | 9 | 8 | 5 |
| cornering stability | 10 | 7 | 7 | 6 | 8 | 9 | 8 | 5 |
| transient performance | 10 | 6 | 7 | 7 | 9 | 8 | 8 | 5 |

DESCRIPTION OF THE REFERENCE SIGNS 1 pneumatic tire
2 tread portion
6 carcass
7 belt layer
7A belt ply
10 belt cord
Co tire equator
Pc center position
Ps shoulder position

The invention claimed is:

1. A pneumatic tire comprising:
a belt layer disposed in a tread portion and radially outside a carcass and composed of two or more belt plies including the narrowest belt ply,
the belt plies each composed of belt cords inclined with respect to the tire circumferential direction and extending continuously from one axial edge to the other axial edge of the belt ply,
wherein given that:
(1) a center position is an axial position on the tire equator;
(2) a shoulder position is an axial position on each side of the tire equator at a distance of 15 mm inward in the axial direction from the axially outer end of the narrowest belt ply along the outer surface of the belt layer;
(3) an average cord angle θn is the average of the cord angles with respect to the tire circumferential direction, of the belt cords of all the belt plies obtained at an axial position between the center position and the shoulder position; and
(4) an average cord count Nn is the average of the cord count per 25 mm width perpendicularly to the belt cords, of the belt cords of all the belt plies obtained at an axial position between the center position and the shoulder position,
the average cord angle θn gradually increases from the center position to the shoulder positions,
the average cord count Nn gradually increases from the center position to the shoulder positions,
the ratio θns/θnc of the average cord angle θns at the shoulder positions to the average cord angle θnc at the center position is more than 1.00 and not more than 1.30, and
the ratio Nns/Nnc of the average cord count Nns at the shoulder positions to the average cord count Nnc in the center position is more than 1.00.

2. The pneumatic tire according to claim 1, wherein the ratio θns/θnc is 1.20 or less.

3. The pneumatic tire according to claim 2, wherein the average cord angle θn is 10 to 40 degrees.

4. The pneumatic tire according to claim 1, wherein the average cord angle θn is 10 to 40 degrees.

5. The pneumatic tire according to claim 4, which is a motorcycle tire in which a tread surface of the tread portion between tread edges is curved convexly so that the maximum tire cross-section width occurs between the tread edges, and said two or more belt plies include the narrowest belt ply and at least one belt ply wider than the narrowest belt ply.

6. The pneumatic tire according to claim 5, wherein
the average cord angle θn continuously increases from the center position to the shoulder positions, and
the average cord count Nn continually increases from the center position to the shoulder positions.

7. A pneumatic tire comprising:
a belt layer disposed in a tread portion and radially outside a carcass and composed of two or more belt plies including the narrowest belt ply,
the belt plies each composed of belt cords inclined with respect to the tire circumferential direction and extending continuously from one axial edge to the other axial edge of the belt ply,
wherein given that:
(1) a center position is an axial position on the tire equator;
(2) a shoulder position is an axial position on each side of the tire equator at a distance of 15 mm inward in the axial direction from the axially outer end of the narrowest belt ply along the outer surface of the belt layer;
(3) an average cord angle θn is the average of the cord angles with respect to the tire circumferential direction, of the belt cords of all the belt plies obtained at an axial position between the center position and the shoulder position; and
(4) an average cord count Nn is the average of the cord count per 25 mm width perpendicularly to the belt cords, of the belt cords of all the belt plies obtained at an axial position between the center position and the shoulder position,
the average cord angle θn gradually increases from the center position to the shoulder positions,
the average cord count Nn is constant from the center position to the shoulder positions,
the ratio θns/θnc of the average cord angle θns at the shoulder positions to the average cord angle θnc at the center position is more than 1.00 and not more than 1.30, and
the ratio Nns/Nnc of the average cord count Nns at the shoulder positions to the average cord count Nnc in the center position is 1.00.

8. The pneumatic tire according to claim 7, wherein the ratio θns/θnc is 1.20 or less.

9. The pneumatic tire according to claim 8, wherein the average cord angle θn is 10 to 40 degrees.

10. The pneumatic tire according to claim 7, which is a motorcycle tire in which a tread surface of the tread portion between tread edges is curved convexly so that the maximum tire cross-section width occurs between the tread edges, and said two or more belt plies include the narrowest belt ply and at least one belt ply wider than the narrowest belt ply.

11. The pneumatic tire according to claim 10, wherein the average cord angle θn is 10 to 40 degrees.

12. The pneumatic tire according to claim 11, wherein the average cord angle θn continuously increases from the center position to the shoulder positions.

13. A pneumatic tire comprising:
a belt layer disposed in a tread portion and radially outside a carcass and composed of two or more belt plies including the narrowest belt ply,
the belt plies each composed of belt cords inclined with respect to the tire circumferential direction and extending continuously from one axial edge to the other axial edge of the belt ply,
wherein given that:
(1) a center position is an axial position on the tire equator;
(2) a shoulder position is an axial position on each side of the tire equator at a distance of 15 mm inward in the axial direction from the axially outer end of the narrowest belt ply along the outer surface of the belt layer;
(3) an average cord angle θn is the average of the cord angles with respect to the tire circumferential direction, of the belt cords of all the belt plies obtained at an axial position between the center position and the shoulder position; and
(4) an average cord count Nn is the average of the cord count per 25 mm width perpendicularly to the belt cords, of the belt cords of all the belt plies obtained at an axial position between the center position and the shoulder position,
the average cord angle θn is 10 to 40 degrees and gradually increases from the center position to the shoulder positions,
the average cord count Nn gradually decreases from the center position to the shoulder positions,
the ratio θns/θnc of the average cord angle θns at the shoulder positions to the average cord angle θnc at the center position is more than 1.00 and not more than 1.30, and
the ratio Nns/Nnc of the average cord count Nns at the shoulder positions to the average cord count Nnc in the center position is 0.80 or more and less than 1.00.

14. The pneumatic tire according to claim 13, which is a motorcycle tire in which a tread surface of the tread portion between tread edges is curved convexly so that the maximum tire cross-section width occurs between the tread edges, and said two or more belt plies include the narrowest belt ply and at least one belt ply wider than the narrowest belt ply.

15. The pneumatic tire according to claim 14, wherein the ratio θns/θnc is 1.20 or less.

16. The pneumatic tire according to claim 15, wherein
the average cord angle θn continuously increases from the center position to the shoulder positions, and
the average cord count Nn continually decreases from the center position to the shoulder positions.

* * * * *